United States Patent [19] [11] 3,886,122
Fabris et al. [45] May 27, 1975

[54] POLYURETHANE ADHESIVE COMPOSITION WITH MINIMAL MOISTURE SENSITIVITY

[75] Inventors: Hubert Jakob Fabris; David Ross Sponseller, both of Akron; Heinz Uelzmann, Tallmadge; Arden Everett Schmucker, Alliance, all of Ohio

[73] Assignee: The General Tire & Rubber Company, Akron, Ohio

[22] Filed: Mar. 11, 1974

[21] Appl. No.: 450,012

[52] U.S. Cl. .......... 260/75 NP; 156/331; 260/37 N; 260/75 NH; 260/77.5 AM
[51] Int. Cl.² ........................................ C08G 22/16
[58] Field of Search..... 260/75 NP, 77.5 AM, 37 N, 260/75 NH

[56] References Cited
UNITED STATES PATENTS

| | | | |
|---|---|---|---|
| 3,114,735 | 12/1963 | Pigott | 260/75 NP |
| 3,488,302 | 1/1970 | Pyron | 260/75 NP |
| 3,644,569 | 2/1972 | Pietsch et al. | 260/858 X |
| 3,658,939 | 4/1972 | Carpenter et al. | 260/75 NP |
| 3,666,835 | 5/1972 | Schloss | 260/858 |
| 3,763,274 | 10/1973 | Wang et al. | 260/858 |

OTHER PUBLICATIONS

Carvey et al., Adhesives Age, Sept. 1968, pages 35–37.
Flory-Principles of Polymer Chemistry, Cornell Univ. Press, (Ithaca) 1953, pages 348–354.

Primary Examiner—H. S. Cockeram

[57] ABSTRACT

Polyurethane adhesive compositions, particularly the conventional two-component systems, are rendered minimally sensitive to moisture on a substrate surface by limiting the ratio of active hydrogen atoms to isocyanate groups to from about 1.1:1 to 1.9:1 while maintaining the ratio of calculated branching coefficient to critical branching coefficient at 1.4:1 or higher.

6 Claims, No Drawings

POLYURETHANE ADHESIVE COMPOSITION WITH MINIMAL MOISTURE SENSITIVITY

BACKGROUND OF THE INVENTION

Urethane-based adhesives are well-known and widely used to adhere a variety of substrates together. The choice of urethane adhesives over other adhesives is based in part upon their outstanding characteristics with respect to bond strength, tensile strength and handling characteristics.

Generally speaking, conventional polyurethane-based adhesives are primarily two component systems wherein the two components contain all of the necessary ingredients to promote and accomplish full curing to a highly tenacious material. The two components are mixed together immediately prior to application to the substrates.

One of the components of these polyurethane-based adhesives is an isocyanate-terminated prepolymer compound. Such a compound is normally prepared by reacting a polyisocyanate with a polyhydroxy compound or other compound containing labile hydrogen atoms that will give a positive Zerewitinoff test. The isocyanate group reacts with the hydroxyl group to form a urethane group. A molar excess of the isocyanate is used so that the resulting compound contains free isocyanate groups.

The other component is a cross-linking mixture comprising an admixture of a polyol, i.e. a polyhydroxy compound, free of isocyanate groups and containing selected urethane catalysts. When the two components are admixed, for example, in a mixing head and then the resulting mixture is applied to a surface, the reactive hydrogen of the polyol reacts with the free isocyanate groups and chain extends and crosslinks the isocyanate-terminated prepolymer (through catalytic action of the urethane catalyst) to form a cured adhesive.

Other optional ingredients which can be added to either component include thickeners, stabilizers, fire retardants, inorganic and organic fillers and pigments and the like.

Application of polyurethane-based adhesive to either metal or plastic surfaces generally involves cleaning the surfaces followed by the optional application of primers, drying the surfaces, applying the adhesive as a coating of finite thickness to the surfaces and then contacting the surfaces and clamping them together for a period sufficient to allow the adhesive to react and cure.

Any water, even as moisture absorbed or adsorbed on a substrate surface, presents a problem in bond strength of such adhesives to the substrate surface because it causes the formation of a very thin but definite cellular layer of relatively low strength and low density between the substrate surface and the principal adhesive layer by reaction of the water with —NCO groups to form $CO_2$ and expansion. This problem is not so critical with porous substrates (fabric or leather) which may be weaker than the foam layer but which in any case allow the produced carbon dioxide gas (from the $NCO+H_2O$ reaction) to escape with a resulting collapse in the foam layer prior to curing. However, with impermeable substrates such as metals and plastics this problem is critical because considerably lower bond strengths are obtained as the $CO_2$ cannot readily escape.

Because it takes very little moisture to produce the undesirable foam layer, merely wiping the substrate surface is insufficient to avoid the problem unless the ambient atmosphere is extremely dry. However, there is generally enough water vapor in the air to produce minute but detrimental instant condensation on a substrate surface after wiping. This phenomenon is aggravated by the most commonly used priming technique which consists, for example, of wiping the substrate surface with a dilute solution of an organic polyisocyanate or isocyanate terminated prepolymer containing two or more free NCO groups per molecule and a total free NCO content of 5–40% in a highly volatile solvent such as methylene dichloride. Evaporation of the primer solvent has a strong cooling effect on the substrate surface resulting in greater moisture condensation than would otherwise take place at ambient air temperature, especially at high humidity.

One method of alleviating the problem is to predry the substrate by baking to reduce as much as possible moisture condensation on the hot substrate surface immediately prior to the application of the adhesive and assembly. However, such heating is costly, and the heated substrates are inconvenient and sometimes extremely difficult to handle.

The primary object of this invention is to provide an improved polyurethane-based adhesive composition with substantially less moisture sensitivity than previously-known compositions. These and other objects and advantages of the present invention will become more apparent to those skilled in the art from the following detailed description and working examples.

SUMMARY OF THE INVENTION

In polyurethane-based adhesive compositions comprising an intimate blend of (A) an isocyanate-terminated prepolymer preferably containing from about 5 to 30 weight percent free isocyanate groups and (B) a cross-linking mixture of an organic polyhydroxy compound free of isocyanate groups and containing groups having active hydrogen atoms (OH or OH plus a small amount of NH) reactive with the isocyanate groups in the prepolymer and a urethane catalyst, this invention comprises the improvement wherein the ratio of the total isocyanate-reactive hydrogen atoms to isocyanate groups is from about 1.1:1 to 1.9:1, the ratio of the calculated branching coefficient to the critical branching coefficient is at least 1.4:1 and the critical branching coefficient is the reciprocal of $f$-1 wherein $f$ is the weighted average functionality of the reacting molecules in the composition which have functionalities greater than 2. The branching coefficient is calculated as outlined in *Principles of Polymer Chemistry*, Chapter IX, page 347 et seq., by P. J. Flory, Cornell University Press, 1953 based on the assumption that all isocyanate groups have reacted. The critical branching coefficient is the value above which formation of a continuous polymer network occurs. When the recited criteria are met, the composition is sufficiently beyond its gel point to develop adequate strength at elevated temperatures.

DISCUSSION OF DETAILS AND PREFERRED EMBODIMENT

The first component of the polyurethane-based adhesive of this invention comprises (A) an isocyanate-terminated compound generally referred to in the art as a prepolymer. It is prepared by reacting an organic polyhydroxy compound with a polyisocyanate under conditions wherein the number of isocyanate groups supplied by the polyisocyanate exceeds the number of labile hydrogen atoms in the polyhydroxy compound so that the resulting composition is free of labile hydrogen atoms and has in its stead a substantial number of free isocyanate groups for later reaction. The polymeric polyhydroxy compounds usable herein can be dihydroxylated and polyhydroxylated polyethers, polyesters, polyesteramids and hydrocarbons but are generally either polyether polyols or polyester polyols. A small or minor amount of the polymeric polyhydroxy compounds can be replaced with polyhdroxy compounds such as ethylene glycol, propylene glycol, diethylene glycol, glycerol, sorbitol, pentaerythritol, dipropylene glycol and the like. Mixture of the polyhydroxy compounds can be used. These polyhydroxy compounds have molecular weights of from about 60 to 10,000.

Some of these compounds are described in U.S. Pat. No. 3,644,569.

A wide range of polyether or polyester polyols can be used in making these adhesives such as diols, triols, tetrols and the like. Polyether diols are generally made by reacting an alkylene oxide such as propylene oxide with a strong base such as potassium hydroxide, preferably in the presence of water, glycols and so forth. Polyethers having a highly branched chain are readily prepared from alkylene oxides and initiators having an active hydrogen functionality greater than 2. The higher functional initiators that are useful with the alkylene oxides described above include polyols, polyamines and amino alcohols having a total of three or more reactive hydrogen atoms on hydroxyl and primary or secondary amino groups.

Suitable polyols include triols, such as glycerol, trimethylolpropane, butanetriols, hexanetriols, trialkanolamines; various diethylenetriamine, such as erythritol and pentaerythritol; pentols; hexols, such as dipentaerythritol and sorbitol, as well as alkyl glucosides, carbohydrates, polyhydroxy fatty acid esters such as castor oil, and polyoxy alkylated derivatives or polyfunctional compounds having three or more reactive hydrogen atoms, such as, for example, the reaction product of trimethylolpropane, glycerol and other polyols with ethylene oxide, propylene oxide or other epoxides or copolymers thereof, e.g., copolymers of ethylene and propylene oxides, and ethylene oxide being used in a molar amount of not over 20 mol % as compared to other alkylene oxides like propylene oxide. Higher functional amino alcohols and polyamines include, for example, ethanolamine, diethanolamine, triethanolamine, isopropanolamine, diisopropanolamine, triisopropanolamine, 2-(2-aminoethylamino)ethanol, 2-amino-2(hydroxymethyl)-1,3-propanediol, ethylenediamine, diethylenetriamine, triethylenetetramine, and urea as well as various aryl polyamines such as 4,4′,4″-methylidynetrianiline.

Polyester polyols are formed from the condensation of one or more polyhydric alcohols with one or more polycarboxylic acids. Examples of suitable polyhydric alcohols include the following: glycerol; pentaerythritol; trimethylolpropane; 1,4,6-octanetriol; butanediol; pentanediol; hexanediol; dodecanediol; octanediol; chloropentanediol; glycerol monallyl ether; glycerol monoethyl ether; diethylene glycol; 2-ethylhexanediol-1,4; cyclohexanediol-1,4; 1,2,6-hexanetriol; 1,3,5-hexanetriol; 1,3-bis-(2-hydroxyethoxy)propane and the like. Examples of polycarboxylic acids include the following: phthalic acid; isophthalic acid; terephthalic acid; tetrachlorophthalic acid; maleic acid; dodecylmaleic acid; octadecenylmaleic acid; fumaric acid; aconitic acid; trimellitic acid; tricarballylic acid; 3,3′-thiodipropionic acid; succinic acid; adipic acid; cyclohexane-1,2-dicarboxylic acid; 1,4-cyclohexadiene-1,2-dicarboxylic acid; 3-methyl-3,5-cyclohexadiene-1,2-dicarboxylic acid and the corresponding acid anhydrides, acid chlorides and acid esters such as phthalic anhydride, phthaloyl chloride and the dimethyl ester of phthalic acid. Preferred polycarboxylic acids are the aliphatic and cycloaliphatic dicarboxylic acids containing no more than fourteen carbon atoms and the aromatic dicarboxylic acids containing no more than fourteen atoms. Any polyhydric alcohol having more than 2 hydroxyl groups or any polycarboxylic acid having more than 2 carboxylic groups used to make the polyesters should be used in only very minor amounts to prevent crosslinking and gelling.

Generally, the polyhydroxyl compounds suitable for employment can be conveniently characterized as normally liquid (although meltable solids are not excluded), pourable polyethers, polyesters, etc. having viscosities in the range of from 50 centipoises to about 500,000 centipoises at room temperature (i.e., 25°C.) and preferably having molecular weights in the range of from about 60 to 10,000.

A wide variety of polyisocyanate compounds can be used in the prepolymer preparation. Examples of suitable organic polyisocyanates include the isomers and isomeric mixtures of toluene diisocyanate, 1,5-napthalenediisocyanate, cumene-2,4-diisocyanate, 4-methoxy-1,3-phenylenediisocyanate, 4-chloro-1,3-phenylene-diisocyanate, 4-bromo-1,3-phenylenediisocyanate, 4-ethoxy-1,3-phenylenediisocyanate, 2,4′-diisocyanatodiphenylether, 5,6-dimethyl-1,3-phenylenediisocyanate, 2,4-dimethyl-1,3-phenylenediisocyanate, 4,4′-diisocyanatodiphenylether, 4,4′-diphenyldiisocyanate, 4,6-dimethyl-1,3-phenylenediisocyanate, 1,10-anthracenediisocyanate, 4,4′-diisocyanatodibenzyl, pure or polymeric diphenylmethanediisocyanates such as 4,4′-diisocyanatodiphenyl-methane, 3,3-dimethyl-4,4′-diisocyanatodiphenylmethane, 2,6-dimethyl-4,4′-diisocyanatodiphenyl and others and mixtures of the same. While aliphatic polyisocyanates can be used, it is preferred to use the aromatic diisocyanates, particularly the toluene diisocyanates and the commercial polymeric isocyanates based on aniline-formaldehyde condensation products of relatively low molecular weight.

To this first component can also be added other ingredients nonreactive with isocyanates such as stabilizers including hydrolytic stabilizers, thickeners, antioxidants, dyestuffs, fillers and the like in amounts considered useful by those skilled in the art, e.g., up to 1 part of stabilizer and up to 50 parts or more of fillers per 100 parts by weight of prepolymer. The preparation of polyurethane prepolymers having free or reactive —NCO groups is well known.

The second component (B) is the curative or crosslinking component and comprises principally compounds containing reactive hydrogen, normally as hydroxyl or amino hydrogen atoms, as exemplified by the polyhydroxy compounds discussed supra such as polyetherpolyols, polyesterpolyols, etc. of the types described above with active hydrogen functionalities of 2 to 8 per polymer molecule with, optionally, small amounts of urethane and/or urea groups in their polymer chains and mixtures of the same. Component (B) can and generally does contain urethane curing catalysts to promote the isocyanate-hydrogen curing reaction and, optionally, other ingredients such as hydrolytic and UV stabilizers, antioxidants, thickeners, fillers, dyestuffs, etc. Small amounts of aliphatic or aromatic amines with amine functionalities from 1–3 per molecule as described in U.S. Pat. No. 3,714,127 can be substituted for part of the polyhydroxy compound in component (B). Examples of such amines are primary amines or primary polyamines which may contain some secondary amino groups as well as primary amines having hydroxyl groups like ethylene diamine, diethylenetriamine, tetramethylenediamine, pentamethylenediamine, hexamethylenediamine, 2,5-diamino-n-hexane, xylene diamine, 1,3-diaminopropanol-2, and the like and mixture of the same.

The catalysts used to promote the urethane chain extension and cross-linking reaction are preferably tin compounds such as, for example, stannous carboxylates like stannous acetate, stannous octoate, stannous laurate, stannous oleate and the like; or dialkyl tin salts of carboxylic acids such as dibutyltin diacetate, dibutyltin dilaurate, dibutyltin maleate, dibutyltin di-2-ethylhexoate, dilauryltin diacetate, dioctyltin diacetate and the like. Similarly, there can be used a trialkyltin hydroxide, dialkyltin oxide or dialkyltin chloride. As an alternative or in addition to the above tin compounds, various tertiary amines can be used such as triethylamine, benzyldimethylamine, triethylenediamine and tetramethylbutanediamine. The tin catalysts are generally used in amounts of 0.5 parts or less, i.e. in the range of about 0.00 to 0.5 part, by weight per 100 parts of prepolymer. The tertiary amine catalysts can be used in amounts in the range of 0.00 to about 5 parts by weight per 100 parts of prepolymer. However, at least 0.01 part of at least one type of catalyst should be present.

A number of special aromatic substituted diamines with decreased isocyanate reactivity are sometimes used to chain extend and to cross-link between the free isocyanate-terminated prepolymer and to cure the compound into a rigid, tough cured adhesive. Examples of arylene diamines useful herein include 4,4'-methylene-bis(2-bromoaniline); bis(4-aminophenyl)sulfone; cumene-2,4-diamine; 4-chloro-1,3-phenylenediamine; 9,10-anthracenediamine; 4,4'-diaminodibenzyl; 2,4-diaminostilbene; 1,4-anthradiamine; 2,5-fluorenediamine; 1,8-naphthalenediamine; 2,2'-dimethylbenzidine; and 2,2'-dichloro-5,5'-diethoxybenzidine and the like and mixtures of the same.

The separate components of the adhesives are generally blended together in a high shear mixing head and the resultant uniform blend applied directly to the surface to be bonded. However, the adhesives of this invention have substantially lower sensitivity to surface moisture because they are formulated such that the ratio ($r$) of the concentration of the sum total of all isocyanate-reactive hydrogen atoms [$H_R$] to the concentration of isocyanate groups [NCO] is from about 1.1:1 to 1.9:1. The higher threshhold limit of this ratio is determined by the average functionality ($f$) of molecules having functionalities larger than two and the mole fraction ($p$) of such molecules present in the total adhesive formulation comprising both components (A) and (B). It is most important that the reactant ratio ($r$) at any given overall functionality of molecules having functionalities larger than two (branching units) ($f$) is chosen such that the crosslinked polyurethane is sufficiently beyond its gel point to develop adequate strength in the adhesive, and this is the case when the ratio of the calculated branching coefficient to critical branching coefficient is at least 1.4. This can be expressed symbolically as:

$$\frac{\alpha(\text{calculated})}{\alpha(\text{critical})} \geq 1.4$$

where $\alpha$ (calculated) is the value of the branching coefficient calculated for a system with a given ($r$) under the assumption that all isocyanate groups have reacted and $\alpha$ (critical) is the critical value of the branching coefficient above with formation of a continuous network will occur and is equal to the reciprocal of ($f-1$), i.e. $\alpha$ (critical) = $1/(f-1)$. Calculations of the branching coefficients are made following the outlines given by P. J. Flory, in *Principles of Polymer Chemistry*, Chapter, IX, Page 347 et seq., Cornell University Press, 1953. While good room temperature adhesion values can be obtained with a ratio of $\alpha$ (calculated)/ $\alpha$ (critical) of 1.1, the adhesive strength is lost at even slightly elevated temperatures.

The surfaces to be bonded should be clear of foreign matter and grease, and this is generally accomplished by such known techniques as by sand-blasting or by swabbing the surfaces lightly with a rag soaked in some organic volatile solvent like methylene chloride containing, for example, from 1 to 50%, preferably 1 to 5%, by weight of a commercial polymeric isocyanate from 4,4'-diisocyanatodiphenylmethane or any other NCO group-containing material containing two or more free NCO groups per molecule.

While the adhesives of this invention are known as polyurethane adhesives, they may contain other materials that are not involved with the formation of the urethane bond. The strength of the present cured polyurethane adhesive is so great as to permit extended dilution with fillers and other low cost materials materials sacrificing a significant amount of the strength of the adhesive bond.

Substitution of certain primary amines for some of the polyhydroxy compound in component (B) or the cross-linker is acceptable so long as the required limitations are met as previously described.

The method of using the adhesive made according to this invention is as follows: A plastic adherend such as a fiber reinforced plastic (FRP) panel or structure is positioned in a clamping frame in preparation for the bonding operation. The bonding surface of the structure is wiped, for example, with a solution of 1 to 5 percent by weight 4,4'-diisocyanatodiphenylmethane in methylenechloride and permitted to air dry. Another adherend such as a plastic or metal panel or structure that is to be bonded to the first adherend is positioned near the first adherend and its bonding surface is also cleaned. The prepolymer and cross-linking composition may be mixed by hand but preferably are machine mixed. Into a mixing head positioned near the bonding operation is introduced the above-described two adhesive components wherein the cross-linking component contains from about 5 to 30 equivalent percent of the primary amines exemplified above and these components are intimately blended to produce an uncured adhesive. This uncured adhesive is deposited from the mixing head to provide layers of finite thickness over the bonding surfaces of both adherends and the adherends are subsequently placed in contact and clamped together with sufficient pressure to hold the parts together while curing. Where the surfaces to which the adhesive is applied are on an inclined or overhead plane, the adhesive does not exhibit the sag or run-off prevalent with present commercially-available urethane adhesives not containing the defined primary amines employed in this invention. Following a short time in which the urethane adhesive cures, e.g., a few minutes at 120° to 150°C. or 15 to 45 minutes or more at room temperature, the bonded adherends are released from the clamps, and the fully bonded structure is sent along to the next operation such as for painting.

The following examples will serve to illustrate the present invention with more particularity to those skilled in the art. Unless noted otherwise, all quantitative measurements are parts by weight.

EXAMPLE I

In this example component (A) was an isocyanate-terminated prepolymer prepared by heating for 1 hour at 100°–105°C. a mixture of 211.4 parts of polypropylene ether glycol (1000 average mol. wt.), 61.95 parts of polypropylene ether glycol (400 average mol. wt.), 170.8 parts of an 80/20 mixture of 2,4- and 2,6-tolylene diisocyanates (TDI) and 126.5 parts of talc, yielding a prepolymer having a viscosity of 24,000 cps. at 25°C. and a free isocyanate content of 11 weight percent corresponding to an equivalent weight of 384.

Component (B), the curative or cross-linker, was a blend prepared by mixing to a homogeneous solution at 50°–70°C. the following ingredients:

| Ingredient | Parts |
| --- | --- |
| a commercial polypropyleneether triol having 1000 average mol. wt.(OH No.=168) | 20.0 |
| N,N,N',N'-tetra kis-2-hydroxy propyl ethylenediamine | 47.0 |
| a commercial propylene oxide adduct of methyl glucoside having a hydroxyl number of 300, an equiv. wt. of 181, a hydroxyl functionality of four and a molecular weight of 724 | 22.0 |
| 2,6-di-t-butyl-4-methyl-phenol | 1.0 |
| trimethylolpropane | 5.5 |
| dibutyltin dilaurate | 0.05 |
| ethylenediamine | 3.0 |
| a commercial 1,4-dialkylamino-anthraquinone dye (Calico Oil Blue ZV, American Cyanamid) | 0.025 |
| triethylene diamine | 1.0 |

Component (B) had a viscosity of 6000 cps. at 23.3°C. and an average equivalent weight of 97.

A number of 2.54 cm.×7.62 cm.×0.32 cm. samples were cut from a molded commercial FRP sheet (glass fiber mat impregnated with polyester-styrene mixture and cured) and exposed to air for 20 hours at 75°C. and 25% relative humidity. The sample surfaces to be bonded were wiped with tissue paper saturated with a 2 percent solution in methylene chloride of a commercial phosgenated anilineformaldehyde condensation product having an average molecular weight of 350 and an average isocyanate functionality of 2.6 (Mobay Mondur MRS).

A series of adhesives were prepared by mixing components (A) and (B) in various ratios corresponding to various values of $r$ (as shown below). Pairs of samples were bonded together in a 90° crosswise fashion with the center overlapping 6.45 square cm. bonded by applying a 0.89 mm. layer of each adhesive on the previously wiped surfaces and pressing the surfaces together with finger pressure. The bonded samples were cured by heating them for 6 minutes at 120°±5°C. After cooling for about an hour at room temperature, the samples were destructively tested on a cross-pull tester. The cross-pull tester holds the cross shaped sample in such a way as to permit application of tension stress normal to the adhesive layer. There may be adhesion failure at the interface between the adhesive and the substrates, cohesive failure in the adhesive (CFA) and cohesive failure in the substrates (CFS). The principal type of failure was visually estimated in each case.

The results were as follows:

TABLE I

| Run | I-1 | I-2 | I-3 | I-4 | I-5 | I-6 |
| --- | --- | --- | --- | --- | --- | --- |
| Component (A) (parts) | 45 | 40 | 35 | 30 | 25 | 20 |
| Component (B) (parts) | 10 | 10 | 10 | 10 | 10 | 10 |
| r, [$H_{\textit{BNCO}}$] | 0.89 | 1.0 | 1.14 | 1.33 | 1.6 | 1.89 |
| $\alpha$(calc.)/$\alpha$(crit.) | — | 2.75 | 2.36 | 1.98 | 1.6 | 1.34 |
| Gel time, RT about 25°C. (min.) | 5 | 3.5 | 3.75 | 3.25 | 2.5 | 2.5 |
| Gel time, 120°C. (min.) | 2.5 | 2.25 | 2.5 | 1.75 | 2.5 | 3.0 |
| Break strength (kg.) (ca 25°C.) | 23.1 | 31.3 | 40 | 39.5 | 42.6 | 42.6 |
| Failure (type and %) | CFA100 | CFA95 | CFA75 | CFA90 | CFS50 | CFS80 |

None of the examples exhibited failure at the interface.

EXAMPLE II

A second curative component (B-II) was prepared by blending into a homogeneous solution 80 parts of a commercial poly-(propylene oxide) triol having an average molecular weight of about 4700, 18 parts of the commercial polypropylene oxide adduct of methyl glucoside the same kind as used in Example I, 1.5 parts of dibutyltin dilaurate and 1.33 parts of the TDI the same kind as used in Example I to increase viscosity. After stirring for 1 hour at room temperature (about 25°C. there were added 36.5 parts of N,N,N', N'-tetra kis-2-hydroxy propyl ethylenediamine and 2.0 parts of ethylene diamine after which the whole mixture was stirred at 40°–50°C. until homogeneous. The resulting component (B-II) had a viscosity of 6000 cps at 24.4°C. and an equivalent weight of 198. Adhesives were prepared by mixing component (B-II) with various amounts of prepolymer (A) from Example I. Test specimens were then prepared, cured and tested as described in Example I with the following results.

TABLE II

| Run | II-1 | II-2 | II-3 |
|---|---|---|---|
| Component (A) (parts) | 25.6 | 29.1 | 33 |
| Component (B-II) (parts) | 10 | 10 | 10 |
| r, $[H_{RINCO}]$ | 1.13 | 1.0 | 0.88 |
| $\frac{\alpha(calc.)}{\alpha(crit.)}$ | 2.54 | 2.94 | — |
| Gel time, 25°C. (min.) | 2.75 | 2.75 | 3.25 |
| Gel time, 120°C. (min.) | 1.5 | 1.5 | 1.5 |
| Break strength (kg.) (ca 25°C.) | 43.5 | 43.1 | 40.8 |
| Failure (type and %) | CFS100 | CFS55 | CFA80 |

EXAMPLE III

In this example a prepolymer was prepared by reacting 49.5 parts of a commercial polypropyleneether glycol (1000 average mol. wt.) with 26 parts of 80/20 TDI in admixture with 24.5 parts of talc at 100°–105°C. for approximately 1 hour. The resulting prepolymer had a free isocyanate content of 8.4% and a viscosity of 22,000 cps. at 25°C. This prepolymer was blended with an equal weight of the same type of prepolymer used as component (A) in Example I resulting in a component (A-III) for this example having a free isocyanate content of 9.44%, a viscosity of 23,000 cps at 25°C. and an average equivalent weight of 457.

A curative component (B-III) was prepared by mixing until homogeneous the following ingredients in the parts by weight as indicated:

| | |
|---|---|
| the commercial polypropyleneether glycol (1000 av. mol. wt.) as used above | 20.0 |
| N,N,N',N'-tetra kis-2-hydroxy propylethylenediamine | 47.5 |
| the commercial propylene oxide adduct of methyl glucoside the same as used in Example I | 23.54 |
| 2,6-di-t-butyl-4-methyl-phenol | 1.0 |
| trimethylolpropane | 5.5 |
| ethylenediamine | 2.25 |
| dibutyltin dilaurate | 0.05 |
| the dye as used in Example I | 0.02 | the resulting component (B-III) mixture had a viscosity of 6500 cps. at 23.9°C. and an average equivalent weight of 101. Test sample strips were cut as described in Example I, conditioned at 60% and 80% relative humidity (RH) at 25°C. for 24 hours prior to bonding and wiped as described in Example I. Prepolymer component (A-III) and curative component (B-III) were then mixed together in the ratio r, $H_{RINCO}$ as shown in Table III below, and the adhesive mixture was then used to coat the sample strips. Test samples were then prepared from these strips, cured and tested, all as described in Example I with the following results:

TABLE III

| Run | III-1 | III-2 | III-3 | III-4 | III-5 |
|---|---|---|---|---|---|
| RH (%) | 60 | 60 | 80 | 80 | 80 |
| r, $[H_{RINCO}]$ | 1.1 | 1.2 | 1.2 | 1.3 | 1.4 |
| $\frac{\alpha(calc.)}{\alpha(crit.)}$ | 2.47 | 2.24 | 2.24 | 2.05 | 1.89 |
| Break strength (kg.) (ca 25°C.) | 29.0 | 41.7 | 43.1+ | 43.1+ | 43.1+ |
| Failure (type and %) | CFA100 | CFS100 | CFA90 | CFS75 | CFS100 |

EXAMPLE IV

Test sample strips were exposed to 20%, 50%, 60% and 80% relative humidity (RH) at 25°C. respectively for 24 hours. Immediately after removal from the humidity chamber the respective strips were wiped and bonded together with a blend of 25.5 parts of prepolymer component (A) of Example I and 15 parts of curative component (B) of Example I to give r, $H_{RINCO}$, of 1.14 in accordance with the procedures described in Example I. The resulting test samples were cured and tested as described in Example I with the following results:

TABLE IV

| Run | IV-1 | IV-2 | IV-3 | IV-4 |
| --- | --- | --- | --- | --- |
| RH (%) | 20 | 50 | 60 | 80 |
| Gel time, 25°C. (min.) | 2.75 | 2.75 | 2.75 | 2.75 |
| Gel time, 120°C. (min.) | 2.0 | 2.0 | 2.0 | 2.25 |
| Break strength (kg.) (ca 25°C.) | 39.5 | 42.6 | 39.9 | 30.4 |
| Failure (type and %) | CFS100 | CFS100 | CFS100 | CFA100 |

We claim:

1. An adhesive composition prepared by intimately blending (A) a liquid isocyanate-terminated polyurethane prepolymer containing from about 5 to 30 weight percent free isocyanate groups and (B) a liquid crosslinking mixture comprising at least one organic polyhydroxy compound free of isocyanate groups and containing groups having active hydrogen atoms reactive with the isocyanate groups in the prepolymer (A) and a urethane catalyst, the ratio of the total isocyanate-reactive hydrogen atoms in (B) to isocyanate groups in (A) being from about 1.1:1 to 1.9:1, and the ratio of the calculated branching coefficient to the critical branching coefficient of the total system being at least 1.4, where the critical branching coefficient is the reciprocal of $f-1$ and where $f$ is the average functionality of the reacting molecules in (A) and (B) having a functionality higher than 2.

2. An adhesive composition in accordance with claim 1 wherein the polyhydroxy compound in prepolymer (A) and in compound (B) are each selected from the class of polyethers and polyesters having molecular weights of from about 60 to 10,000, and compound (B) contains 2 to 8 active hydrogen atoms per molecule.

3. An adhesive composition in accordance with claim 2 wherein prepolymer (A) is the reaction product of a polypropylene ether glycol and an aromatic diisocyanate.

4. An adhesive composition in accordance with claim 1 wherein component (A) contains up to 50 parts by weight of fillers per 100 parts by weight of the prepolymer.

5. An adhesive composition in accordance with claim 1 wherein component (B) contains up to 0.5 part by weight of tin-containing urethane catalyst and up to about 5 parts by weight of tertiary amine urethane catalyst per 100 parts by weight of the prepolymer, there being at least 0.01 part of at least one such catalyst.

6. An adhesive composition comprising the cured reaction product of the blend of claim 1.

* * * * *